(12) United States Patent
Viot et al.

(10) Patent No.: US 9,688,833 B2
(45) Date of Patent: Jun. 27, 2017

(54) METHOD FOR RECYCLING POLYMERS AND PRODUCT PRODUCED FROM SAID METHOD

(71) Applicant: Compagnie Plastic Omnium, Lyons (FR)

(72) Inventors: Frederic Viot, Poncin (FR); Philippe Le Bot, Saint Nazaire (FR); Francois Gueneron, Chalon sur Saone (FR)

(73) Assignee: Compagnie Plastic Omnium, Lyons (FR)

( * ) Notice: Subject to any disclaimer, the term of this patent is extended or adjusted under 35 U.S.C. 154(b) by 3 days.

(21) Appl. No.: 14/655,373

(22) PCT Filed: Dec. 24, 2013

(86) PCT No.: PCT/FR2013/053264
§ 371 (c)(1),
(2) Date: Jun. 25, 2015

(87) PCT Pub. No.: WO2014/102506
PCT Pub. Date: Jul. 3, 2014

(65) Prior Publication Data
US 2015/0353703 A1    Dec. 10, 2015

(30) Foreign Application Priority Data

Dec. 28, 2012 (FR) .................................. 12 62919

(51) Int. Cl.
| | |
|---|---|
| C08G 8/30 | (2006.01) |
| C08J 11/06 | (2006.01) |
| C08J 11/02 | (2006.01) |
| B29B 17/02 | (2006.01) |
| C08J 11/08 | (2006.01) |

(52) U.S. Cl.
CPC .............. *C08J 11/06* (2013.01); *B29B 17/02* (2013.01); *C08J 11/02* (2013.01); *C08J 11/08* (2013.01); *B29B 2017/0293* (2013.01); *C08J 2323/02* (2013.01); *C08J 2323/10* (2013.01); *C08J 2323/12* (2013.01); *Y02W 30/701* (2015.05)

(58) Field of Classification Search
CPC ................ C08J 11/06; C08J 3/12; B29B 9/16
USPC .................................... 528/502, 503; 521/47
See application file for complete search history.

(56) References Cited

U.S. PATENT DOCUMENTS

| | | | |
|---|---|---|---|
| 6,919,383 B2 | 7/2005 | Khan et al. | |
| 8,008,537 B2 | 8/2011 | Leone et al. | |
| 2002/0169223 A1 | 11/2002 | Khan et al. | |
| 2007/0004812 A1 | 1/2007 | Karthauser et al. | |
| 2008/0045772 A1 | 2/2008 | Leone et al. | |
| 2009/0300982 A1* | 12/2009 | Mauldin | C09C 1/021 47/58.1 SC |
| 2015/0267028 A1* | 9/2015 | Viot | B29C 47/38 428/327 |

FOREIGN PATENT DOCUMENTS

| | | | | |
|---|---|---|---|---|
| FR | 2864095 A1 | 6/2005 | | |
| JP | 2007321124 | * 12/2007 | .............. | C08J 5/04 |
| KR | 100828146 B1 | 5/2008 | | |
| WO | WO 0077071 | * 12/2000 | ............. | C08G 63/80 |
| WO | 2005021625 A1 | 3/2005 | | |

* cited by examiner

*Primary Examiner* — Terressa Boykin
(74) *Attorney, Agent, or Firm* — Jacox, Meckstroth & Jenkins (57) ABSTRACT

The invention relates to a recycling method for obtaining a polymer from "post-consumer" materials, and to a material and a part consisting of polymers obtained from the recycling of used polymers.

24 Claims, 4 Drawing Sheets

METHOD FOR RECYCLING POLYMERS AND PRODUCT PRODUCED FROM SAID METHOD

CROSS-REFERENCE TO RELATED APPLICATIONS

This application is the U.S. National Phase application of PCT Application No. PCT/FR2013/053264 filed Dec. 24, 2013, which claims priority to the French application 1262919 filed on Dec. 28, 2012, which applications are incorporated herein by reference and made a part hereof.

BACKGROUND OF THE INVENTION

1. Field of the Invention

This invention relates to a method for recycling polymers.

A "post-consumer" material, as defined in article 7.8.1.1 of ISO 14021 ("Environmental labels and declarations—Self-declared environmental claims (Type II environmental labelling)"), is a "material generated by households or by commercial, industrial and institutional facilities in their role as end-users of the product, which can no longer be used for its intended purpose. This includes returns of material from the distribution chain". This type of material is different from a "pre-consumer" material as defined in the same article of the standard, i.e. a "material diverted from the manufacturing waste stream".

2. Description of the Related Art

To date, the polymers obtained from "post-consumer" materials could not be used to manufacture coated parts, not accepting appearance faults, or at least not at high concentrations.

SUMMARY OF THE INVENTION

The invention solves this problem.

To this end, the invention relates to a method for recycling polymers from ground "post-consumer" materials, wherein it comprises a step for extracting volatile organic compounds present within the polymers.

The extraction step takes place after the sorting, grinding, separation, washing, and drying steps, already known for the recycling of plastics.

This type of method reduces, in polymers obtained from "post-consumer" materials, the presence of pollutants such as volatile organic compounds (VOCs), which the inventors have seen to cause appearance faults in parts manufactured from these polymers.

At least three texts define volatile organic compounds.

Directive 1999/13/EC of the European Council of Mar. 11, 1999 on the limitation of emissions of volatile organic compounds due to the use of organic solvents in some activities and facilities defines a volatile organic compound as "any organic compound having, at 293.15 K, a vapor pressure of 0.01 kPa or more, or having a corresponding volatility under the particular conditions of use".

Decree No. 2006-623 of May 29, 2006, on the limitation of emissions of volatile organic compounds due to the use of organic solvents in some paints and varnishes and vehicle refinishing products, defines a volatile organic compound as "any organic compound having an initial boiling point, measured at a standard pressure of 101.3 kPa, is less than or equal to 250° C.".

Standard NF ISO 16000-6 of May 5, 2005 defines volatile organic compounds according to their boiling point and distinguishes, according to the classification adopted by the World Health Organization in 1989, semi-volatile organic compounds whose boiling point is between (240° C. to 260° C.) and (380° C. to 400° C.), volatile organic compounds whose boiling point is between (50° C. to 100° C.) and (240° C. to 260° C.) and very volatile organic compounds whose boiling point is between <0° C. and (50° C. to 100° C.). The volatile organic compounds of this invention may be any of the semi-volatile organic compounds, volatile organic compounds and very volatile organic compounds defined in this standard.

In this invention, a volatile organic compound is taken to mean a compound which falls within a definition of at least one of these three texts.

These pollutants are not present in virgin polymers (i.e., not produced by recycling) but are produced during the life of the polymer under the action of degradation due to aging, temperature, light and external pollutions such as engine oils or contaminations of any kind. They may be alkanes, alkenes and fatty acid esters, as well as silicones or mineral oils from engine oils. They are present not only on the surface but also within the polymer to be recycled, trapped and/or dissolved in the entanglement of the polymer chains. This explains why simply washing the ground material is not sufficient to remove them and why extraction is required.

Furthermore, the inventors have discovered that the passage, in paint lines, of parts with a high concentration of polymers obtained from "post-consumer" materials pollutes the paint line. They observed in fact that after the passage of such parts, any subsequent part made of virgin material, passing in the paint line, has appearance faults. The invention overcomes this disadvantage by protecting the paint line from this pollution.

Preferably, the volatile organic compounds are extracted by contacting the ground material with a solution comprising at least a wetting agent and/or an agent for solubilizing fatty acid esters, at a temperature at least 15° C. below the boiling point of the solution, or preferably between 15° C. and 5° C. below the boiling point of the solution.

The inventors discovered that the volatile organic compounds contained in the polymers can be caused to migrate outside the polymers under the influence of three factors.

Under the effect of heat, the plastic softens, allowing the formation of spaces between the long tangled chains of polymers forming the plastic, which facilitates the mobility of the volatile organic compounds present between the polymer chains.

The presence of the wetting agent reduces the surface tension of the extraction solution, which therefore penetrates between the polymer chains more easily. The volatile organic compounds can therefore be placed in contact with the solution and be entrained.

Lastly, the presence of an agent for solubilizing the fatty acid esters allows these compounds, which represent some of the volatile organic compounds present in the polymers, to dissolve in the solution. These compounds are then entrained outside the polymers.

It is preferable not to exceed a temperature greater than 5° C. below the boiling point since these high temperatures are associated with high evaporation which requires renewing the solution more frequently and generates larger quantities of emissions.

Advantageously, the wetting agent is an alcohol.

In the method according to the invention, alcohol offers the advantage of increasing the solubility of the alkanes and alkenes in the solution.

Preferably, the wetting agent is a C1-C5 aliphatic alcohol, or preferably C1-C3, or even more preferably a denatured alcohol containing a mixture of C1, C2 and C3 alcohols.

These alcohols offer the advantage of generating effluents that are easily treated, requiring only possible dilution for their treatment. However, in a preferred embodiment, the alcohol used as wetting agent must have a chain not exceeding 5 carbon atoms and therefore having good solubility in water.

Advantageously, the alcohol content of the solution is between 4% and 25% by volume.

It is preferable not to exceed an alcohol content of 25% by volume due to the emissions generated. In addition, a higher alcohol content would have a negative impact on the lifetime of the production facilities, thereby reducing the safety of these facilities. Lastly, maintaining a low alcohol content limits the costs associated with implementation of the method.

Preferably, the agent for solubilizing the fatty acid esters is an acid added to the solution so that the solution pH is greater than or equal to 2 and less than or equal to 5, or preferably between 4 and 5.

It is preferable to maintain the pH of the solution at a value of at least 2 due to industrial constraints such as durability and safety of the facilities.

Optionally, the acid is selected from the group of mineral acids, or preferably is hydrochloric acid or sulphuric acid.

Preferably, the fragments of the ground material have a thickness of less than 5 mm and have a surface area of between 1 cm$^2$ and 4 cm$^2$.

Preferably, the volatile organic compounds to be extracted are molecules of molar mass less than 400 g/mol.

Advantageously, the polymers to be recycled are polyolefins (homopolymers or copolymers of olefins), and preferably polypropylene.

Preferably, extraction is carried out under atmospheric pressure.

Preferably, the solution is in liquid state.

Optionally, the polymer resulting from the method is the same as the polymer contained in the "post-consumer" material subjected to the method.

The invention also relates to a material obtained from the method described above.

The invention also relates to a part manufactured in the above material.

This invention also concerns a part for a motor vehicle made from polymers produced by recycling polymers obtained from "post-consumer" materials.

Parts for motor vehicles made of polymers obtained from "post-consumer" materials are known in the state of the art. Traditionally, however, the use of these polymers is limited to the manufacture of structural parts, or at least hidden parts, or without coating, or at least having no appearance requirements.

However, the use of such polymers for the manufacture of visible parts, visible within the meaning of the definition of Directive 98/71/EC of the European Parliament and of the Council of Oct. 13, 1998 on the legal protection of designs or models, namely that "the part is visible during normal use, i.e. use by the end user, excluding maintenance, servicing or repair work", the parts having appearance requirements are faced, when used at high contents, with problems of appearance faults when these parts are painted or covered with another coating.

Such use of polymers obtained from "post-consumer" materials, if it was to increase, would reduce the production cost for these parts.

Moreover, this new destination for recycled polymers would increase the overall volumes of recycled plastics and therefore draw more significantly from the benefits of recycling plastics, namely limitation of the use of natural resources such as fossil fuels and reduction of the volume of plastic waste, poorly degradable and responsible for pollution.

One object of this invention is therefore to provide parts for motor vehicles, made from polymers obtained from "post-consumer" materials.

Thus, the invention relates to a motor vehicle part having, after coating with paint, varnish, chromium or a decorative film, the following appearance requirements:
  gloss under incident angle of 20° of between 65% and 90% reflected light,
  a maximum of 4 faults of type grains, craters, or particles per m$^2$, of size greater than 50 μm,
  resistance to external aggression defined by no peeling after adhesion test under each of the following conditions:
  in the initial state,
  after the part has been immersed in demineralized water at 40° C. for 10 days or 60° C. for 3 days, the resistance to external aggression test being carried out 1 hour after taking out and wiping the part,
  and after exposure at a temperature of 85° C. for 7 days, the resistance to external aggression test being carried out after cooling to room temperature, and
  peeling of the paint film less than 2 cm$^2$ over the entire part, after the part has been given at least five X-cuts down to the substrate each inside a square of side 10 cm and has then been subjected for 30 seconds to a water jet at 85° C. at a pressure of 65 bar from a flat nozzle of a high-pressure cleaner positioned 10 cm from the part, the peeling of each cross not exceeding 1 cm$^2$,
  the part being made of polymers, some of which are obtained from ground "post-consumer" materials, wherein the percentage by weight of polymers obtained from ground "post-consumer" materials is greater than or equal to 30, or preferably greater than or equal to 50, or still more preferably equal to 100.

The appearance requirements are measured as follows:

Gloss is measured using a glossmeter of type Byk Gardner Microgloss 20° or Microtrigloss, Labomat Essor REFO 3 or Minolta Multigloss 268, under the conditions of use indicated by the manufacturer. The calibration standard is an opaque black glass plate with one side flat and polished, of minimum thickness 5 mm, and is accompanied by its own gloss values for the angle of 20°, certified by organizations such as the National Research Council (NRC Canada) and the Bundesanstalt fur Materialforschung und -prüfung (BAM Germany). The surface to be measured is prepared by washing with soapy water or a suitable product which does not damage the surface, rinsing, wiping and drying. The measurement is taken in an area away from direct lighting. It is taken at 4 points on the surface, in different directions; the measurement points farthest apart must not be more than 100 mm away from each other. In case of curved surfaces, the glossmeter can be pivoted slightly to obtain the maximum value of the point considered, which will be the value recorded for this point.

We consider the substrate which is the bare bodywork part on which the coating is applied and the film which is the continuous covering resulting from application on the substrate of one or more coating layers (generally the primer, the base and the varnish). To evaluate the resistance to external aggression, the paint film is cut through to the substrate to form a grid and the adhesion of the squares in the lattice is assessed. The tests are conducted in a room at a temperature between 21° C. and 25° C. The test must be conducted in three different locations of the specimen. Six parallel cuts are made, followed by six cuts crossing the initial cuts at 90°. The spacing of the cuts must be as follows:

1 mm for a single-coat or unprimed lacquer,
2 mm for a primer, a base and a varnish,
1 mm for the inner parts whose coating thickness is less than 60 μm,
2 mm for the inner parts whose coating thickness is greater than or equal to 60 μm.

The specimen is then lightly brushed. Adhesive tape of adhesivity between 600 g/cm and 750 g/cm (according to standard NF EN 1939) is then applied. The center of the adhesive tape is placed on the grid, parallel to one of the cut directions, and is pressed on and around the grid and over a length of at least 20 mm, smoothing it with the rounded edge of a piece of wood. The adhesion time is at least one minute. Within five minutes after applying the adhesive tape, it is removed by taking the free end and pulling it off rapidly, within 0.5 to 1 second, at an angle as close as possible to 60°.

The manufacture of such parts will increase the proportion of polymers obtained from "post-consumer" materials in the motor vehicle parts.

The inventors have in fact observed that in coated parts using 30% or more of polymers obtained from "post-consumer" materials, appearance faults due to the presence of foreign bodies, flakes and unmelted clusters are detected. In particular, the following appearance faults are defined:
- grains are faults due to small dust particles found on the surface of the injected polymer which either remain on the surface of the substrate, or are deposited between two successive coats of the film, creating an appearance fault by deformation thereof, or are deposited on the last coat of the paint film,
- craters are fault due to a local reduction in the thickness of the paint film; this reduction is due to pollution on the surface of the substrate which changes the surface tension of the polymer and prevents the paint from spreading correctly,
- particles are due to the presence of solid impurities which are incompatible with the injected polymer and create appearance faults by deformation of the substrate surface and therefore of the paint film.

In particular, the maximum fault density accepted in the appearance areas of visible parts is 3 faults per m².

The appearance areas are those of the visible sides of parts visible by an observer of adult height standing beside the vehicle, wherein they have a flat or convex surface with a radius of curvature greater than 500 mm.

Optionally, the part is a bodywork part.

Table 1 shows the effect of the percentage of polymers obtained from ground "post-consumer" materials on the appearance of motor vehicle parts. It also shows the effect of the treatment by the recycling method on the appearance of these parts. This appearance data represents a summary of the values obtained over several hundred polypropylene motor vehicle parts. All the appearance data measurements were taken according to the methods described above.

TABLE 1

| Material | Gloss (percentage of light reflected under incident angle of 20°) | Number of faults (grains, craters, particles) of area less than 1 mm²/m² | High-pressure cleaner Total area peeled off over the set of 5 crosses (cm²) | Largest area peeled off on one cross (cm²) | Peeling after adhesion test Initial state | Immersion in water | Exposure to heat | Pollution of the paint line |
|---|---|---|---|---|---|---|---|---|
| 30% recycled polypropylene, non treated | 65 to 80 | 5 to 6 | 2 to 3 | 1.5 | no | no | no | yes |
| 30% recycled polypropylene, treated | 65 to 90 | ≤4 | <2 | ≤1 | no | no | no | no |
| 100% recycled polypropylene, non treated | 65 to 70 | 5 to 8 | 2 to 4 | 1.5 | no | yes, sometimes | no | yes |
| 100% recycled polypropylene, treated | 65 to 90 | ≤4 | <2 | ≤1 | no | no | no | no |

The first row shows the appearance data of parts containing 30% recycled polypropylene, i.e. obtained from ground "post-consumer" materials which have not undergone extraction of pollutants according to the invention. In this example, the gloss and resistance to external aggression (peeling after adhesion test) data comply with the appearance requirements to be achieved with the invention. In contrast, the density of faults (grains, craters, or particles) is greater than the accepted density (more than 4 defaults/m²) and peeling of the paint film after the part has been subjected to a high-pressure cleaner is greater than the accepted peeling, in peeled area on all crosses and in peeled area on at least one of the crosses. We also observe that the paint line is polluted.

These results are different from those obtained for other parts (row 2) also containing 30% recycled polypropylene having undergone extraction of pollutants according to the invention. The appearance data recorded for these parts complies with the appearance requirements to be achieved with the invention. In addition, the passage of these parts on the paint line did not pollute the line.

The third row shows the appearance data of parts made entirely of recycled polypropylene not having undergone extraction of pollutants according to the invention. In this example, the appearance data does not comply with the appearance requirements to be achieved with the invention. Lastly, the paint line is polluted after passage of these parts.

In contrast, the appearance data recorded for parts (row 4) made entirely of recycled polypropylene having undergone extraction of pollutants according to the invention complies with the appearance requirements to be achieved. In addition, the passage of these parts on the paint line did not pollute the line.

Table 2 shows the effect of temperature during extraction of pollutants according to the invention on the appearance of motor vehicle parts. This appearance data represents a summary of the values obtained over several hundred polypropylene motor vehicle parts. All the appearance data measurements were taken according to the methods described above.

TABLE 2

| Material | Gloss (percentage of light reflected under incident angle of 20°) | Number of faults (grains, craters, particles) of area less than 1 mm²/m² | High-pressure cleaner | | Peeling after adhesion test | | | Pollution of the paint line |
|---|---|---|---|---|---|---|---|---|
| | | | Total area peeled off over the set of 5 crosses (cm) | Largest area peeled off on one cross (cm²) | Initial state | Immersion in water | Exposure to heat | |
| 30% recycled polypropylene - extraction at 16° C. below the boiling point | 65 to 80 | 5 to 6 | >2 | 1.5 | no | no | no | yes |
| 30% recycled polypropylene - extraction at 15° C. below the boiling point | 65 to 90 | 4 | <2 | ≤1 | no | no | no | no |
| 30% recycled polypropylene - extraction at 5° C. below the boiling point | 65 to 90 | <4 | <2 | ≤1 | no | no | no | no |

The appearance data of motor vehicle parts made using 30% recycled polypropylene was recorded. The data varies depending on the temperature during the extraction according to the invention. In row 1, at 16° C. below the boiling point, the appearance requirements are not achieved in terms of fault density and peeling of the paint film after the part has been subjected to a high-pressure cleaner. In addition, pollution of the paint line is observed. In rows 2 and 3, however, at temperatures of respectively 15° C. and 5° C. below the boiling point, the appearance data complies with the requirements.

Table 3 shows the effect of the alcohol content of the extraction solution on the appearance of motor vehicle parts. This appearance data represents a summary of the values obtained over several hundred polypropylene motor vehicle parts. All the appearance data measurements were taken according to the methods described above.

TABLE 3

| Material | Gloss (percentage of light reflected under incident angle of 200) | Number of faults (grains, craters, particles) of area less than 1 mm²/m² | High-pressure cleaner | | Peeling after adhesion test | | | Pollution of the paint line |
|---|---|---|---|---|---|---|---|---|
| | | | Total area peeled off over the set of 5 crosses (cm) | Largest area peeled off on one cross (cm²) | Initial state | Immersion in water | Exposure to heat | |
| 30% recycled polypropylene with less than 3% alcohol by volume | 65 to 80 | 5 to 6 | >2 | 1.5 | no | no | no | yes |
| 30% recycled polypropylene with 4% alcohol by volume | 65 to 90 | 4 | <2 | ≤1 | no | no | no | no |
| 30% recycled polypropylene with 25% alcohol by volume | 65 to 90 | <4 | <2 | ≤1 | no | no | no | no |

The appearance data of motor vehicle parts made using 30% recycled polypropylene was recorded. The data varies depending on the alcohol content of the extraction solution. In rows 2 and 3, at respectively 4% and 25% alcohol by volume, the appearance requirements are met. Note however that, as regards peeling of the paint film after the part has been subjected to a high-pressure cleaner, although the value remains acceptable at 4% and 25% alcohol, the area peeled at 4% alcohol is higher than that at 25% alcohol. In contrast, the appearance requirements are not met in terms of fault density and peeling of the paint film after the part has been subjected to a high-pressure cleaner when the alcohol content is 3% (row 1). In the latter condition, pollution of the paint line is also observed.

Table 4 shows the effect of the pH of the extraction solution on the appearance of motor vehicle parts. This appearance data represents a summary of the values obtained over several hundred polypropylene motor vehicle parts. All the appearance data measurements were taken according to the methods described above.

TABLE 4

| Material | Gloss (percentage of light reflected under incident angle of 20°) | Number of faults (grains, craters, particles) of area less than 1 mm$^2$/m$^2$ | High-pressure cleaner Total area peeled off over the set of 5 crosses (cm$^2$) | Largest area peeled off on one cross (cm$^2$) | Peeling after adhesion test Initial state | Immersion in water | Exposure to heat | Pollution of the paint line |
|---|---|---|---|---|---|---|---|---|
| 30% recycled polypropylene - pH = 1.5 | 65 to 90 | ≤4 | <2 | ≤1 | no | no | no | no |
| 30% recycled polypropylene - pH = 2 | 65 to 90 | ≤4 | <2 | ≤1 | no | no | no | no |
| 30% recycled polypropylene - pH = 4 | 65 to 90 | ≤4 | <2 | ≤1 | no | no | no | no |
| 30% recycled polypropylene - pH = 5 | 65 to 90 | ≤4 | <2 | ≤1 | no | no | no | no |
| 30% recycled polypropylene - pH = 5.5 | 65 to 90 | 5 to 6 | 2 to 3 | 1.5 | no | no | no | no |

The appearance data of motor vehicle parts made using 30% recycled polypropylene was recorded. The data varies depending on the pH of the extraction solution. In rows 1 to 3, at a pH respectively of 2, 4 and 5, the appearance requirements are met. In contrast, they are not met in terms of fault density and peeling of the paint film after the part has been subjected to a high-pressure cleaner when the pH is equal to 5.5 (row 4).

It will be easier to understand the invention on reading the description below, given as an example.

These and other objects and advantages of the invention will be apparent from the following description, the accompanying drawings and the appended claims.

BRIEF DESCRIPTION OF THE ACCOMPANYING DRAWINGS

FIGS. 5-7 are representations of appearance faults;

DETAILED DESCRIPTION OF THE PREFERRED EMBODIMENTS

Figure 1:
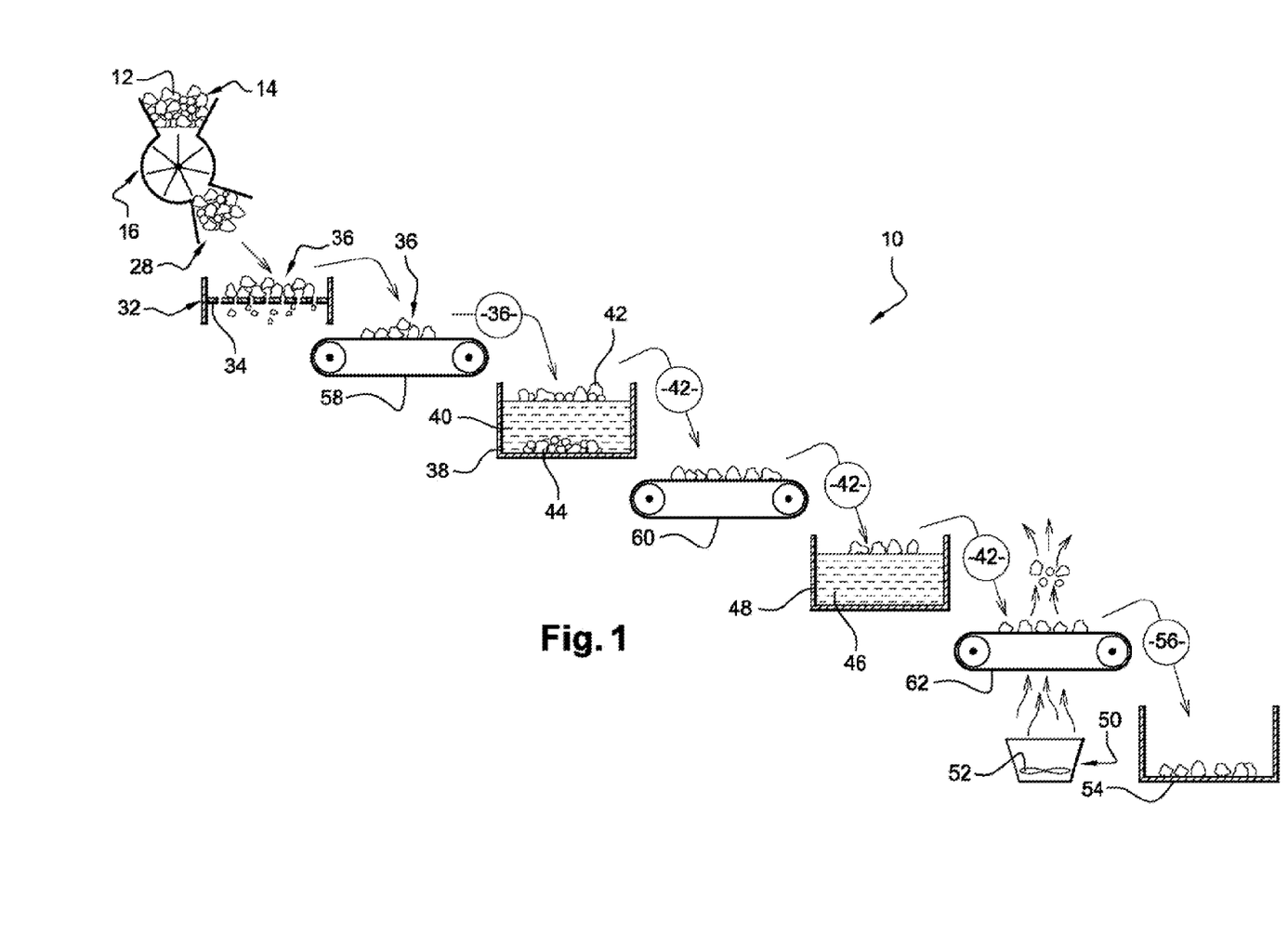
FIG. 1 is a diagrammatic view of a conventional polymer recycling facility.

FIG. 1 shows a conventional polymer recycling facility representing the recycling steps after which the extraction method according to the invention can be implemented. The facility is designated by the general reference 10.

The facility 10 is designed to recover fragments of polyethylene and polypropylene from shredded post-consumer materials 12. In the example described, the shredded post-consumer materials 12 come from a motor vehicle.

Shredded motor vehicle materials consist of a mixture of shredded components of a motor vehicle, once the battery, tires and metal have been recovered.

In general, shredded post-consumer materials 12 include fragments 14 of metallic materials, mineral materials, polymer materials and wood.

The density of wood fragments is generally less than 1 due to the wood structure comprising cavities filled with gas.

In addition, the shredded post-consumer materials 12 may also include fragments of metallic materials such as copper, this material having a density greater than 1.

To separate the fragments of polyethylene and polypropylene from the other fragments, the facility 10 comprises a hammermill 16.

Grinding of the shredded post-consumer materials 12 results in ground materials 28. In these ground materials 28, the dimensions of most of the fragments of polypropylene and polyethylene are greater than 80 mm while those of the other fragments are much less than 80 mm.

To separate the fragments of polyethylene and polypropylene from first ground materials 28, the facility 10 also comprises a screening device 32 to screen the first ground materials 28.

The screening device 32 comprises a sieve 34 whose mesh has an elementary pattern of dimension equal to 80 mm so as to recover second ground materials 36, essentially comprising the fragments of polyethylene and polypropylene of dimensions greater than 80 mm, and remove residual fragments of dimensions less than 80 mm.

The second ground materials 36 may possibly include residual fragments of wood and polymers.

To remove the residual fragments of wood from the second ground materials 36 by densification, the facility 10 comprises a first container 38 containing a liquid medium 40 comprising a basic solution.

This basic solution is designed in particular to densify the wood by hydrolysis.

The container 38 containing the liquid 40 allows the separation of a supernatant portion forming third ground materials 42 from a portion 44, which sinks, containing the densified wood fragments as well as other residual fragments of heavy materials such as, for example, polyethylene and polypropylene.

The facility 10 also comprises a second container 46 containing a liquid medium 48, for cleaning the fragments of the third ground materials 42 obtained previously.

In addition, to remove the foam fragments and recover the fragments of polyethylene and polypropylene in the third ground materials 42, the facility 10 further comprises means 50 for separation by ventilation.

The means for separation by ventilation 50 comprise fans 52.

The facility 10 further comprises a third container 54 for recovering fourth ground materials 56 comprising at least the fragments of polyethylene and polypropylene and from which the foam fragments have been removed.

To convey the ground materials to the containers 38, 46 and 54, the facility 10 also comprises:

- an upstream conveyor belt 58 for conveying the second ground materials 36 to the first container,
- an intermediate conveyor belt 60 for conveying the third ground materials 42 to the second container 46, and
- a downstream conveyor belt 62 for conveying the fourth ground materials 56 to the third container 54.

The extraction method according to the invention is preferably applied to the fourth ground materials 56. It may also be applied to the ground materials 28, 36 and 42. It may also be applied to ground materials from a recycling facility comprising variants of the equipment described with reference to FIG. 1. Some items of equipment may be removed and their order may be changed.

In one embodiment of the method, the ground materials are contacted with the extraction solution for 15 minutes while stirring in order to homogenize the temperature between the liquid and solid phases. The ground materials are then dried by centrifuging. The extraction method can be repeated in several successive tanks.

Figure 2:
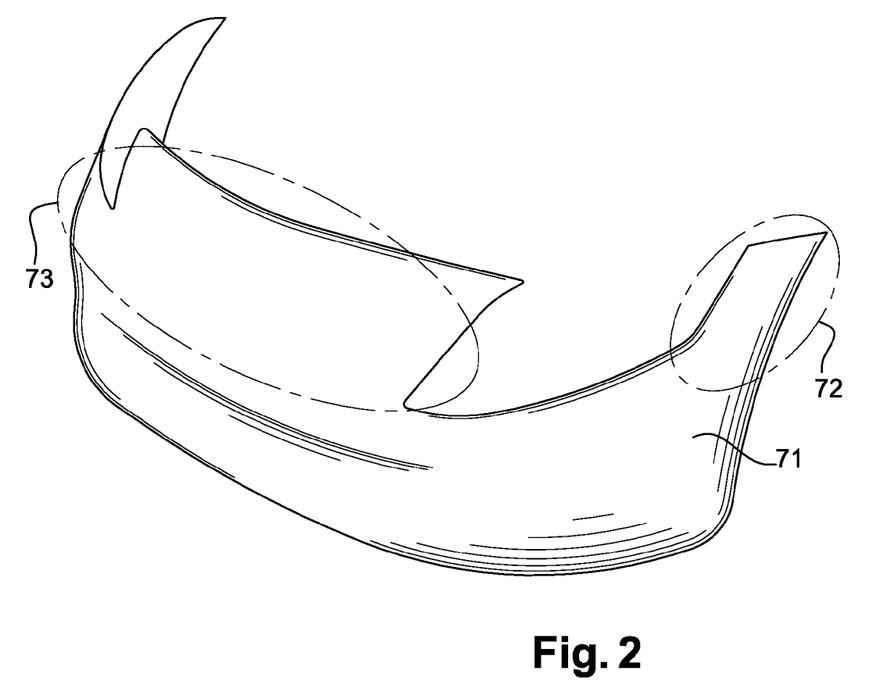
FIG. 2 is a front view in perspective of a front bumper of a motor vehicle.

FIG. 2 is a perspective view of a front bumper 71 of a motor vehicle. Areas 72 and 73 correspond to the appearance areas of the front bumper 71.

Figure 3:
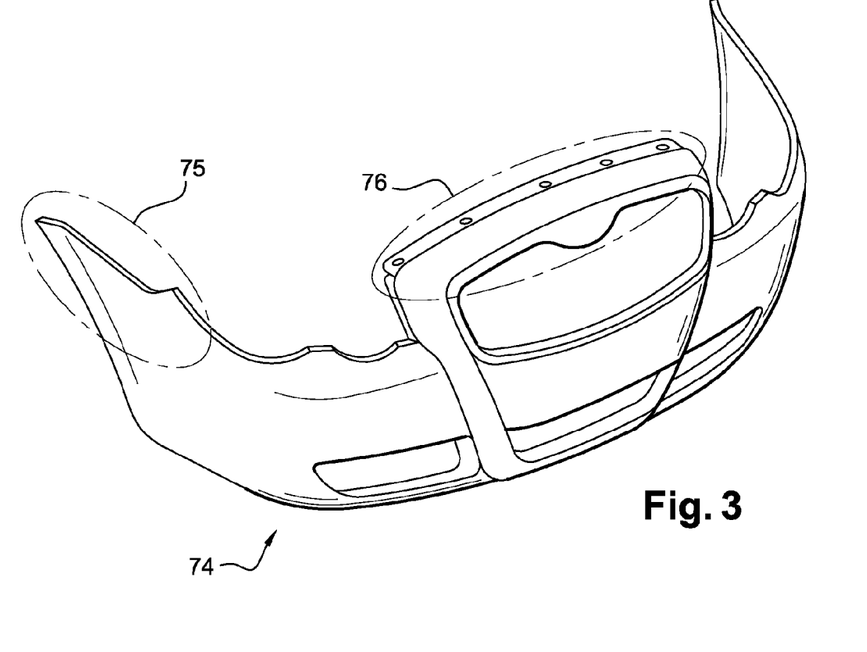
FIG. 3 is a front view in perspective of a front bumper of a motor vehicle.

FIG. 3 is a perspective view of a front bumper 74 of a motor vehicle. Areas 75 and 76 correspond to the appearance areas of the front bumper 74.

Figure 4:
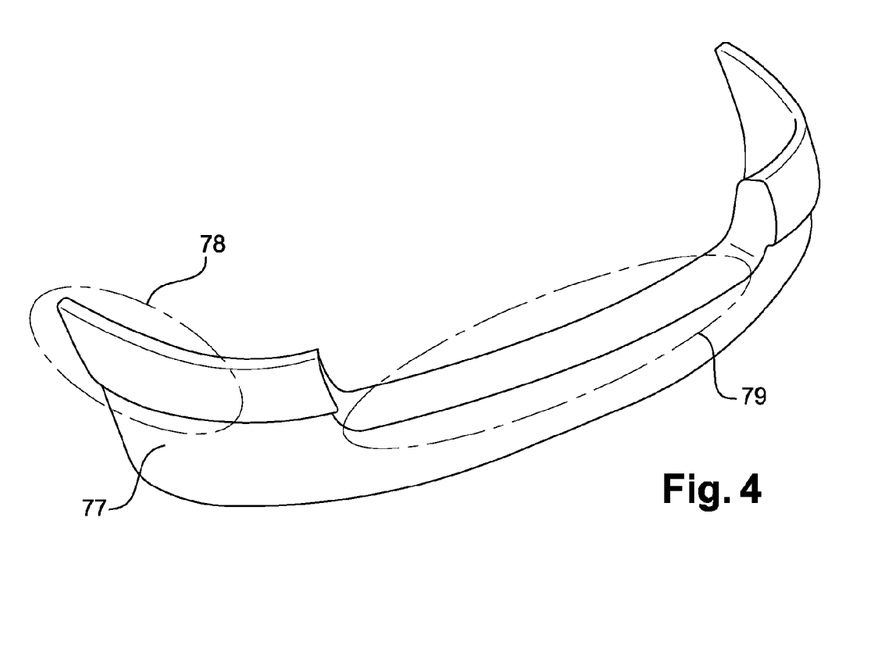
FIG. 4 is a front view in perspective of a rear bumper of a motor vehicle.

FIG. 4 is a perspective view of a rear bumper 77 of a motor vehicle. Areas 78 and 79 correspond to the appearance areas of the rear bumper 77.

Figure 5:
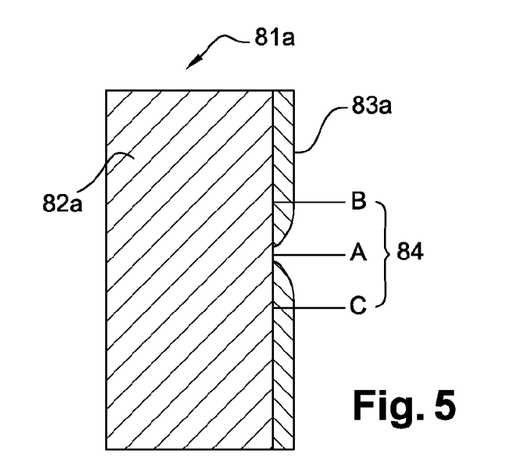
FIG. 5 is an enlarged sectional view of a crater type fault.

FIG. 5 is a sectional view enlarged at a scale of 30:1 of an outer portion of a painted bodywork part 81a consisting of a substrate 82a and a paint film 83a. The thickness of the paint film 83a varies between points B and C, where it is equal to 100 µm. It is equal to 0 µm at point A. In contrast, outside the segment [BC], the film thickness is constant. The portion of the paint film 83a located between points B and C, extending over a length of 0.6 mm, is a schematic representation of a crater type fault 84.

Figure 6:
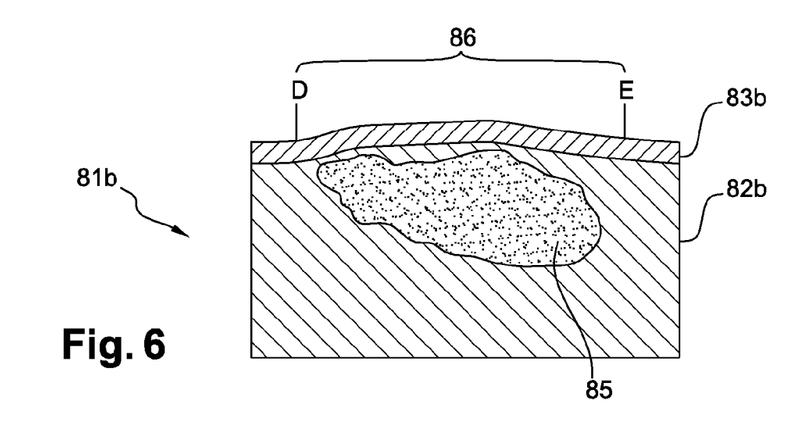
FIG. 6 is an enlarged sectional view of a particle type fault.

FIG. 6 shows a sectional view enlarged at a scale of 30:1 of an outer portion of a painted bodywork part 81b consisting of a substrate 82b and a paint film 83b. The substrate 82b of this figure, unlike that of FIG. 5, does not have a straight surface. Its surface appears to be convex in the portion extending from point D to point E located next to an impurity 85. The portion of the paint film 83b extending from point E to point F, over a length of 1.8 mm, is deformed. It is a schematic representation of a particle type fault 6.

Figure 7:
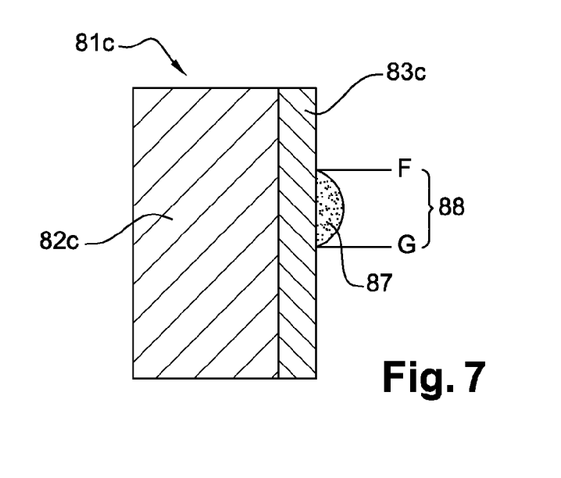
FIG. 7 is an enlarged sectional view of a grain type fault.

FIG. 7 shows a sectional view enlarged at a scale of 75:1 of an outer portion of a painted bodywork part 81c consisting of a substrate 82c and a paint film 83c. The paint film 83c has a constant thickness of 93 µm. A dust particle 87 is deposited on the last coat of the paint film 83c. This fault, extending from points F to G over a length of 0.2 mm, is a schematic representation of a grain type fault 8. The other causes of grain type faults, namely the presence of a dust particle 87 on the substrate surface or between two successive coats of the paint film 83c, creating an appearance fault by deformation of the paint film 83c, are not shown.

The invention is not limited to the embodiments described above.

The volatile organic compounds can be extracted by using another wetting agent and another agent for solubilizing the fatty acid esters.

Also, the recycling method can be used to manufacture parts other than bodywork parts for motor vehicles and even parts for sectors other than the automotive sector.

Lastly, the recycling method can be applied to polymers other than polypropylene.

While the process and method herein described constitute preferred embodiments of this invention, it is to be understood that the invention is not limited to this precise process and method, and that changes may be made therein without departing from the scope of the invention which is defined in the appended claims.

What is claimed is:

1. A method for recycling polymers from ground "post-consumer" materials, the method comprising a step for extracting volatile organic compounds present within said polymers, wherein said volatile organic compounds are extracted by contacting the ground materials with a solution comprising at least a wetting agent and/or an agent for solubilizing fatty acid esters, at a temperature between 15° C. and 5° C. below the boiling point of said solution.

2. The method for recycling according to claim 1, wherein said wetting agent is an alcohol.

3. The method for recycling according to claim 2, wherein said wetting agent is a C1-C5 aliphatic alcohol.

4. The method for recycling according to claim 2, wherein the alcohol content of said solution is between 4% and 25% by volume.

5. The method for recycling according to claim 1, wherein said agent for solubilizing said fatty acid esters is an acid added to said solution so that the solution pH is greater than or equal to 2 and less than or equal to 5.

6. The method for recycling according to claim 5, wherein said acid is selected from the group of mineral acids.

7. The method for recycling according to claim 1, wherein fragments of the ground material have a thickness of less than 5 mm and have a surface area of between 1 cm$^2$ and 4 cm$^2$.

8. The method for recycling according to claim 1, wherein said volatile organic compounds to be extracted are molecules of molar mass less than 400 g/mol.

9. The method according to claim 1, wherein said polymers to be recycled are polyolefins (homopolymers or copolymers of olefins).

10. The method for recycling according to claim 1, wherein said extraction is carried out under atmospheric pressure.

11. The method for recycling according to claim 1, wherein said solution is in liquid state.

12. The method for recycling according to claim 1, wherein said polymer resulting from said method is the same as the polymer contained in said "post-consumer" material subjected to said method.

13. The material obtained from the method according to claim 1.

14. The part manufactured in the material according to claim 13.

15. The method for recycling according to claim 3, wherein the alcohol content of said solution is between 4% and 25% by volume.

16. The method for recycling according to claim 2, wherein fragments of the ground material have a thickness of less than 5 mm and have a surface area of between 1 cm$^2$ and 4 cm$^2$.

17. The method for recycling according to claim 2, wherein fragments of the ground material have a thickness of less than 5 mm and have a surface area of between 1 cm$^2$ and 4 cm$^2$.

18. The method for recycling according to claim 2, wherein said volatile organic compounds to be extracted are molecules of molar mass less than 400 g/mol.

19. The method for recycling according to claim 2, wherein said volatile organic compounds to be extracted are molecules of molar mass less than 400 g/mol.

20. The method for recycling according to claim 2, wherein said wetting agent is a C1-C3 alcohol.

21. The method for recycling according to claim 1, wherein said wetting agent is a denatured alcohol containing a mixture of C1, C2 and C3 alcohols.

22. The method for recycling according to claim 1, wherein said agent for solubilizing said fatty acid esters is an acid added to said solution so that the solution pH is between 4 and 5.

23. The method for recycling according to claim 5, wherein said acid is hydrochloric acid or sulphuric acid.

24. The method according to claim 1, wherein said polymers to be recycled is polypropylene.

* * * * *

UNITED STATES PATENT AND TRADEMARK OFFICE
CERTIFICATE OF CORRECTION

PATENT NO. : 9,688,833 B2  
APPLICATION NO. : 14/655373  
DATED : June 27, 2017  
INVENTOR(S) : Frederic Viot et al.

Page 1 of 1

It is certified that error appears in the above-identified patent and that said Letters Patent is hereby corrected as shown below:

On the Title Page

Item (71), delete "Lyons" and insert --Lyon-- therefor.  
Item (73), delete "Lyons" and insert --Lyon-- therefor.

Signed and Sealed this  
Third Day of October, 2017

Joseph Matal  
*Performing the Functions and Duties of the*  
*Under Secretary of Commerce for Intellectual Property and*  
*Director of the United States Patent and Trademark Office*